United States Patent
Kratochvil et al.

(10) Patent No.: US 11,079,086 B2
(45) Date of Patent: Aug. 3, 2021

(54) VEHICLE LIGHTING DEVICE WITH A LASER RADIATION SOURCE

(71) Applicant: Varroc Lighting Systems, s.r.o., Senov u Noveho Jicina (CZ)

(72) Inventors: Jan Kratochvil, Horka-Domky (CZ); Michaela Duliakova, Hostasovice (CZ)

(73) Assignee: VARROC LIGHTING SYSTEMS, S.R.O.

( * ) Notice: Subject to any disclaimer, the term of this patent is extended or adjusted under 35 U.S.C. 154(b) by 0 days.

(21) Appl. No.: 17/114,578

(22) Filed: Dec. 8, 2020

(65) Prior Publication Data

US 2021/0180763 A1    Jun. 17, 2021

(30) Foreign Application Priority Data

Dec. 12, 2019   (CZ) .............................. PV 2019-768

(51) Int. Cl.
*F21S 41/675* (2018.01)
*F21S 41/16* (2018.01)
(Continued)

(52) U.S. Cl.
CPC ............. *F21S 41/675* (2018.01); *F21S 41/16* (2018.01); *F21S 41/365* (2018.01);
(Continued)

(58) Field of Classification Search
CPC .... F21S 41/16; F21S 41/30–365; F21S 41/40; G02B 26/0833–0866
(Continued)

(56) References Cited

U.S. PATENT DOCUMENTS

| | | |
|---|---|---|
| 4,868,721 A | 9/1989 | Soardo ............................ 362/80 |
| 7,428,353 B1 | 9/2008 | Milanovic et al. ............. 385/18 |

(Continued)

FOREIGN PATENT DOCUMENTS

| | | |
|---|---|---|
| CZ | 2015-890 A3 | 6/2017 |
| CZ | 2017-36 A3 | 8/2018 |

(Continued)

*Primary Examiner* — Jason M Han
(74) *Attorney, Agent, or Firm* — Ostrolenk Faber LLP

(57) ABSTRACT

A vehicle lighting device that includes a laser radiation source, wherein a controlled reflective MEMS scanning mirror is situated in the path of laser radiation from the laser radiation source, wherein in the path of radiation reflected by the controlled reflective MEMS scanning mirror is located an imaging optical element and further an output optics, wherein the laser radiation source and the MEMS are connected to a power supply and control device. The laser radiation source is formed by an RGB laser radiation source with output white light and the imaging optical element is formed by a screen which is adapted to convert a narrow beam of laser white light directed at the screen surface from the RGB laser source by means of the controlled MEMS reflective scanning mirror at each point of the screen surface to a point source of uniform white light on the screen surface, wherein the uniform white light from this point source on the screen surface has a spherical wavefront of white light propagation and has the same wavelength as the white light directed by the controlled MEMS reflective scanning mirror onto the screen, whereby the output optics is arranged in the direction of travel of the white light with the spherical wavefront from the point source on the screen surface.

6 Claims, 4 Drawing Sheets

(51) Int. Cl.
  *G02B 26/08* (2006.01)
  *F21S 41/365* (2018.01)
  *F21Y 115/30* (2016.01)
  *F21Y 113/17* (2016.01)

(52) U.S. Cl.
  CPC ....... *G02B 26/0833* (2013.01); *F21Y 2113/17* (2016.08); *F21Y 2115/30* (2016.08)

(58) Field of Classification Search
  USPC ......... 362/516–518, 520–522, 538–539, 545
  See application file for complete search history.

(56) References Cited

U.S. PATENT DOCUMENTS

| | | | | |
|---|---|---|---|---|
| 8,502,695 | B2 | 8/2013 | Kishimoto | 340/815.57 |
| 10,260,700 | B2 | 4/2019 | Shimizu et al. | |
| 10,576,873 | B2 * | 3/2020 | Ichikawa | F21S 41/16 |
| 2004/0227984 | A1 | 11/2004 | Yamabana et al. | 359/290 |
| 2007/0109784 | A1 | 5/2007 | Kosnik et al. | 362/260 |
| 2011/0280032 | A1 | 11/2011 | Kishimoto | 362/538 |
| 2013/0058114 | A1 | 3/2013 | Reiners | 362/510 |
| 2014/0307457 | A1 | 10/2014 | Chen | 362/516 |
| 2015/0043233 | A1 | 2/2015 | Bauer et al. | 362/510 |
| 2017/0334341 | A1 | 11/2017 | Kurashige et al. | |
| 2018/0029525 | A1 | 2/2018 | Park et al. | |
| 2018/0045393 | A1 | 2/2018 | Yagi et al. | |
| 2018/0149327 | A1 | 5/2018 | Hechtfischer | |
| 2019/0092224 | A1 | 3/2019 | Kurashige | |

FOREIGN PATENT DOCUMENTS

| | | |
|---|---|---|
| DE | 199 07 943 A1 | 9/2000 |
| DE | 10 2008 022 795 A1 | 11/2009 |
| DE | 10 2011 080 559 A1 | 2/2013 |
| EP | 2 063 170 A2 | 5/2009 |
| EP | 2 821 692 A1 | 1/2015 |
| EP | 2 990 264 A2 | 3/2016 |
| EP | 2 954 256 B1 | 7/2016 |
| WO | WO 2012/076296 A3 | 6/2012 |
| WO | WO 2014/072227 A1 | 5/2014 |
| WO | WO 2014/121315 A1 | 8/2014 |
| WO | WO 2015/049048 A1 | 4/2015 |
| WO | WO 2015/140001 A1 | 9/2015 |
| WO | WO 2017/137221 A1 | 8/2017 |

* cited by examiner

VEHICLE LIGHTING DEVICE WITH A LASER RADIATION SOURCE

TECHNICAL FIELD

The invention relates to a lighting device for a vehicle comprising a laser radiation source, wherein a controlled MEMS reflective scanning mirror is situated in the path of laser radiation from the laser radiation source, wherein in the path of radiation reflected by the controlled MEMS reflective scanning mirror is located an imaging optical element and further an output optics, wherein the laser radiation source and the MEMS reflective scanning mirror are connected to a power supply and control device.

BACKGROUND ART

A lighting device, in particular a projection system for headlights of motor vehicles, comprises at least one optical system including a powerful light source and optical elements. The light source emits light rays, and the optical elements constitute a system of refractive and reflective surfaces, interfaces between optical media and apertures which influence the direction of the light rays as they form an output light trace. In modern motor vehicle headlights, projection systems comprising light units adapted to amplify light by stimulated emission of radiation, the so-called laser, are widely used. A laser is used in headlights as an optical source of electromagnetic radiation in the form of light emitting diodes. Diodes work on the principle of electroluminescence, where after the introduction of electrical voltage, electrical energy is converted to light at a p-n junction. This light is emitted from a laser diode as coherent and monochromatic. The light emitted by laser diodes is most often blue, so, for the use in vehicle headlights, the light rays pass through a converter, most often in the form of yellow phosphorus, such as YAG, which converts blue light to white light.

Thus, unlike conventional LEDs, laser diodes can be used in applications where it is necessary to create a sharp directional light beam. Documents US20110280032A1, WO2015140001A1, US20150043233A1, WO2014121315A1 disclose lighting devices where the laser diodes enable to precisely aim light beams in the given direction and hit even a very distant point, which is used in the front headlights of motor vehicles to ensure a high beam light function. According to the current regulations, light can be emitted to a distance of up to 600 m in front of a vehicle. Thanks to the significantly higher efficiency of optical systems designed for laser sources, higher headlight performance can be achieved. The brightness of a laser source can be up to 100 times higher, whereby optical systems comprising a laser diode are characterized by 50% lower energy consumption compared to conventional LEDs. The drawback of most of the current laser optical concepts is the fact that the advantages of laser diodes are used especially for the function of high beam light function, where it is necessary to provide a high intensity light trace, the above laser systems not being adapted to change the light characteristics of the output light beam depending on the conditions in which the vehicle is located, e.g. not blinding the oncoming driver, light beam width according to the vehicle speed, direction of the light beam emission according to the position of the steering wheel, etc.

Another disadvantage of a laser, but also LED optical concepts, is the fact that excessive light intensity can damage the eyesight and vehicle headlights must be equipped with safety features so that safety limits are not exceeded, especially in case of damaged converter substances or laser diodes themselves. Safety elements in the emission of a laser beam are described, for example, in documents WO2014072227A1, EP2821692A1, WO2015049048A1, WO2012076296A3, U.S. Pat. No. 8,502,695B2.

Document EP2954256B1 discloses a solution in which the light characteristic of the output light beam is ensured by at least two laser diodes, wherein individual modulated laser beams are directed to a light converter by rotating a micromirror. The disadvantage of this solution is the fact that the projected light image consists of several segments, wherein each segment belongs to one laser diode and the optical concept is therefore relatively costly and optically inefficient.

From the background art, laser beam diffraction splitters consisting of a binary grating are known, whereby a binary grating is designed to split the coherent light emitted from the laser diode into a specific number of light beams. Documents US20140307457, CZ20150890 disclose lamps, where the light emitted by one laser diode is divided by a splitter into a plurality of beam portions. The splitter acts as a photon router to direct the photons into a predetermined space. The disadvantage of the current background art is the fact that optical systems comprising a laser beam splitter are intended for signal functions and are not adapted to produce the required output characteristic for lighting the road in front of the driver. Another disadvantage is that the micromirror rotates around only one axis, so that the resulting image can be influenced in only one direction, and only a strip of light can be formed from each laser diode.

Document U.S. Pat. No. 4,868,721 discloses a solution comprising a system of rotating/oscillating micromirrors, which enables to affect the resulting image in two directions. Situated between the laser diode and the mirror is a light modulator which makes it possible to influence the light characteristics of the laser light beam or even interrupt the laser beam completely. The disadvantage of this solution is the fact that the modulator influences the light beam before it hits the micromirror, whereby it is not possible to influence the light characteristic of the light beam after it is reflected from the micromirror.

Document US20130058114 describes a solution in which light beams reflected by a system of micromirrors are directed by an optical system comprising diffractive elements in the form of lenses and prisms, thus making it possible to create a light image consisting of several segments of different shapes, whereby in different light characteristics can be obtained in each segment. The disadvantage of this solution is the fact that it is not possible to create an asymmetrically composed light image and to influence dynamically the light characteristic of the output light trace, for example it is not possible to create an unlit part within one segment of the resulting light image.

DE19907943, EP2063170, DE102008022795, DE102011080559A1, EP2990264 disclose other laser optical systems which are equipped with micromirrors or micro-optical-electro-mechanical systems, the so-called MOEMS. MOEMS elements are most often formed by a system of small mirrors, which today allow to directly control, direct and shape light on the micrometer level before the light hits the laser beam converter. The disadvantage of the concepts known up to now is the fact that rotation/oscillation of the micromirrors is performed in a resonant manner, wherein the micromirror oscillates at the same frequency and amplitude, and so if it is necessary to influence the shape of the output light image, it is necessary to turn off the laser light source.

Also, it is not possible to stop the micromirror in a certain position or to offset/move the axis of rotation/oscillation. The speed of the micromirror varies because it slows down when the direction of rotation is changed. As a result, an uneven light intensity distribution is achieved. To achieve a uniform light intensity distribution, the laser beam or bundle of laser beams must be at a certain time point switched off, switched on or modulated.

Documents US2004227984, U.S. Pat. No. 7,428,353 disclose MOEMS technical solutions, controlling, by means of control electrical or electromagnetic signals, the angle/tilt angle of the micromirror, the range/angle of oscillation of the micromirror, the speed and frequency of the oscillation, whereby it is possible to ensure the micromirror oscillation in two mutually independent directions.

CZ 2017-0036 discloses a lighting device, in particular a projection system of a headlight for motor vehicles comprising a laser light source, a primary optical system with at least one diffractive optical element and/or with at least one reflective optical element for converting monochromatic coherent light produced by the laser light source into a collimated beam of coherent light, a MOEMS comprising one or more micromirrors to direct coherent light to the converter to be converted to white light, and a secondary optical system comprising at least one diffractive optical element and/or at least one reflective optical element to direct white light further out of the lighting device and to form a light pattern on the display surface and/or in specific zones in front of the driver on the road. The system comprises an electromagnetic control system connected to the MOEMS and to the laser light source to control, by transmitting electrical or electromagnetic signals, changing the angle of rotation at least one of the micromirrors, changing its angle of oscillation and changing the speed and frequency of its free end oscillation, and to control the operation of the laser light source, and to achieve a controlled change in the shape and/or position of the light pattern according to the current conditions in which the vehicle is located during its operation.

The disadvantage of the solution according to CZ 2017-0036 is using a monochromatic laser and primary optics to deliver light to a MOEMS element, and then using a wave light converter behind the MOEMS element to convert the monochromatic light to white light, which is then emitted from the headlight by a secondary optics. Such a solution is complex and involves light and energy losses along the path of light from the light source to the secondary optics.

Other lighting devices with laser light sources for motor vehicles are disclosed, for example, in U.S. Ser. No. 10/260, 700B2, US2007109784A1, US2017334341A1, US2018029525A1, US2018045393A1, US2018149327A1, US2019092224A1 and WO2017137221A1.

The object of the invention is to remove the above-mentioned disadvantages of the background art.

SUMMARY OF THE INVENTION

The object of the invention is achieved by a vehicle lighting device with a laser radiation source and element, whose principle consists in that the laser radiation source is formed by an RGB laser radiation source with output white light and an imaging optical element is formed by a screen which is adapted to convert a narrow beam of laser white light directed onto the screen surface from the RGB laser source by means of a controlled MEMS reflective scanning mirror at each point of the screen surface to a point source emitting uniform white light on the screen surface, wherein this uniform white light has a spherical wavefront of white light propagation from this point source on the screen and has the same white light wavelength as the white light directed by the controlled MEMS reflective scanning mirror onto the screen, wherein in the direction of travel of the white light with a spherical wavefront from the point source, an output optics is arranged is on the screen surface.

Such a lighting device is considerably simpler in terms of construction and operation and, what is more, it is a universal lighting means capable of creating any stream of output light of the desired size, intensity and shape.

Preferred embodiments of the invention are the subject matter of the dependent claims.

EXAMPLES OF EMBODIMENT

Figure 1:
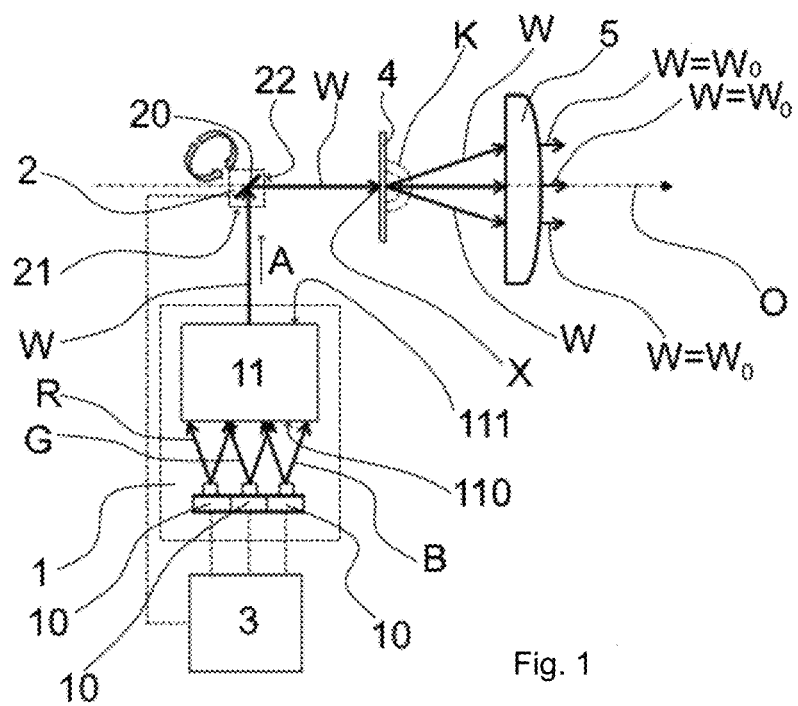
FIG. 1 shows the use of the invention in a device with a light-transmitting screen and with a point source of radiation formed on the axis of illumination.
Figure 1A:
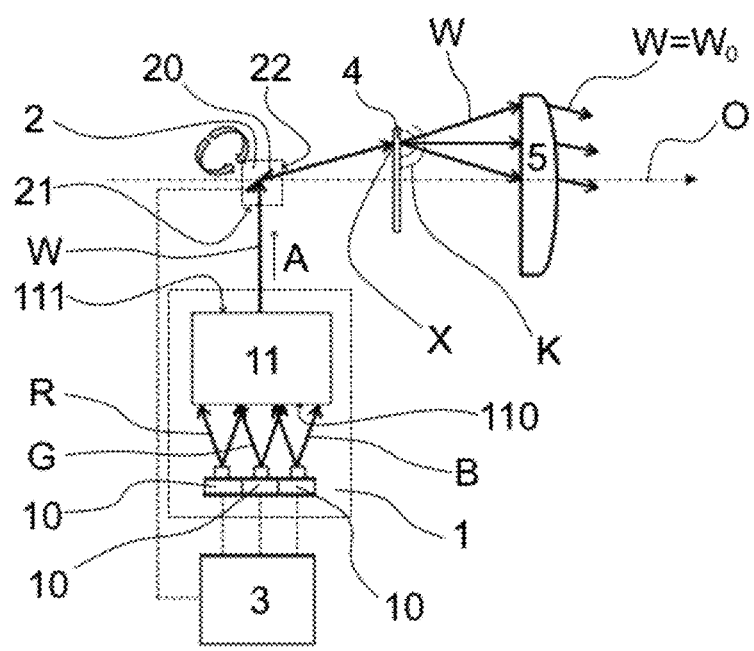
FIG. 1a shows the use of the invention in a device with a light-transmitting screen and with a point source of radiation formed off the axis of illumination.

The invention will be described with reference to exemplary embodiments of a vehicle lighting device with a laser radiation source and a MEMS element.

The laser radiation source consists of an RGB laser radiation source 1, which is connected to a power supply and control device 3, whereby it is assigned by its laser light output 111 to an optical input 21 of a micro-electronic-mechanical-system 2, hereinafter referred to as a MEMS 2.

In an embodiment shown, the RGB laser radiation source 1 comprises a system of mutually separated R, G, B laser radiation sub-sources 10, wherein each of these laser radiation sub-sources 10 is connected to a power supply and control device 3. Such a RGB laser source 1 further comprises an R, G, B laser beams combiner 11, which is by its input 110 or by its inputs assigned to the light outputs of the mutually separated R, G, B laser radiation sub-sources 10. The R, G, B laser beams combiner 11 is adapted to combine the separate R, G, B light beams into white light W, which emerges from the combiner 11 through the laser light output 111 to the further arranged optical input 22 of the micro-electronic-mechanical-system 2, hereinafter only the MEMS 2.

The MEMS 2 is provided with an adjustable reflecting mirror 20, which is controllable in two mutually perpendicular axes lying in a common plane, in short a scanning mirror 20, which is situated behind the optical input 21 of the MEMS 2 obliquely to the direction A of the white light W coming from the RGB laser radiation source 1 into the MEMS 2. The MEMS 2 is connected to the power supply and control device 3.

Figure 3:
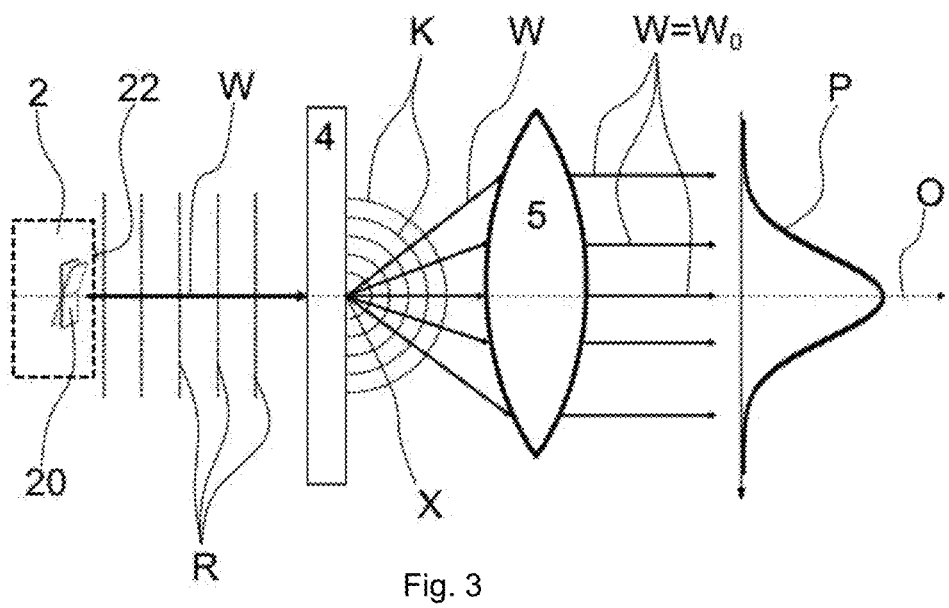
FIG. 3 shows a detail of FIG. 1 with the indication of wavefronts, light path and output light distribution.
Figure 3A:
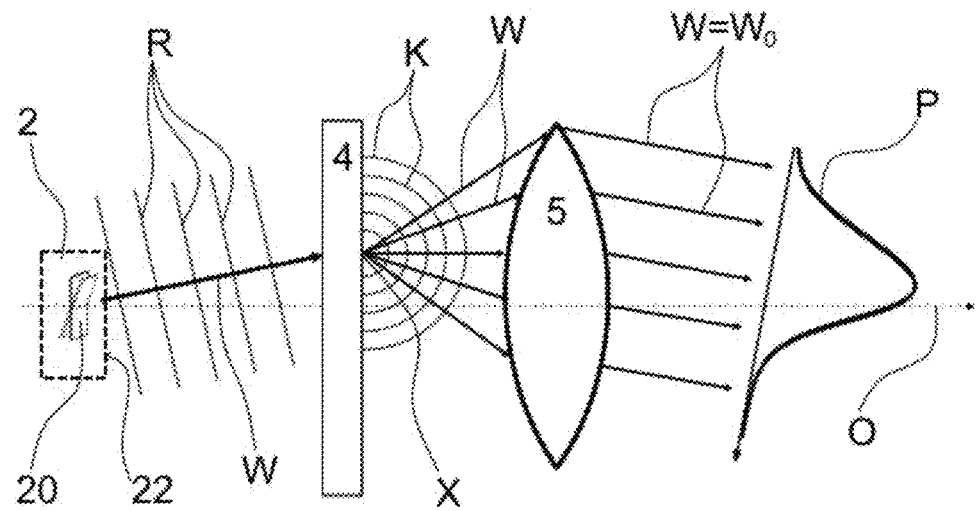
FIG. 3a shows a detail of FIG. 1a with the indication of wavefronts, light path and output light distribution
Figure 4:
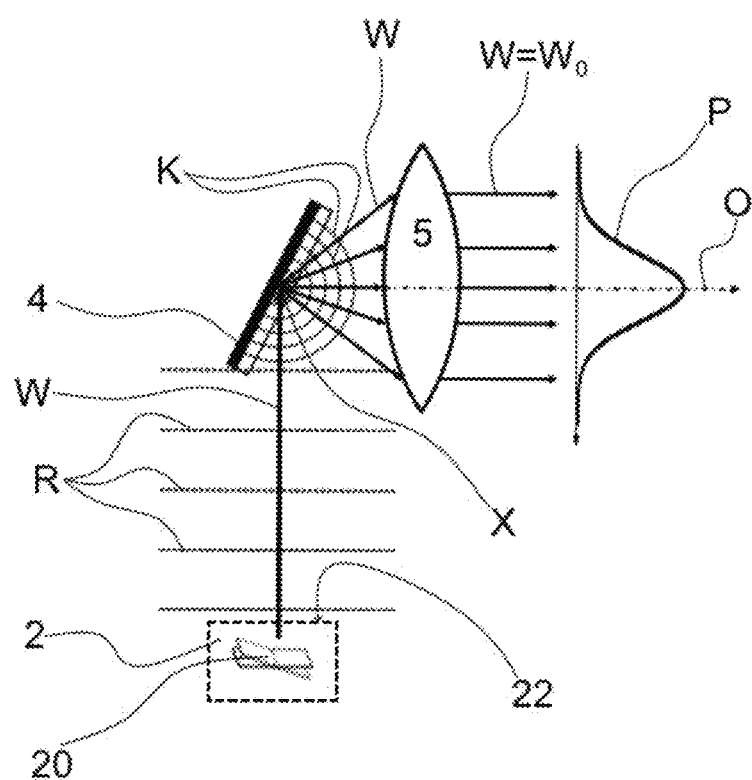
FIG. 4 shows a detail of FIG. 2 with the indication of wavefronts, light path and the output light distribution.

Behind the optical output 22 of the MEMS 2, i.e. in the direction of the reflection of the white light W from the mirror 20 of the MEMS 2, is located a screen 4, which is adapted to convert the incident narrow beam of the laser white light W at each point of its surface to a point source X of uniform white light W according to the Huygens principle with a spherical wavefront K, all without changing the wavelength A of the white light W coming to the screen 4 and leaving screen 4, i.e. maintaining this wavelength A of the white light, as shown in FIGS. 3, 3a and 4. It is clear that the narrow beam of the laser white light W coming to the screen 4 from the MEMS 2 has planar wavefronts R, as shown in more detail in FIGS. 3, 3a and 4. The screen 4 is preferably formed by a diffusion element with a Lambert characteristic or a characteristic similar to Lambert characteristic. In another preferred embodiment, the screen 4 consists of a diffractive optical element with a different, e.g. user-defined, characteristic.

Figure 2:
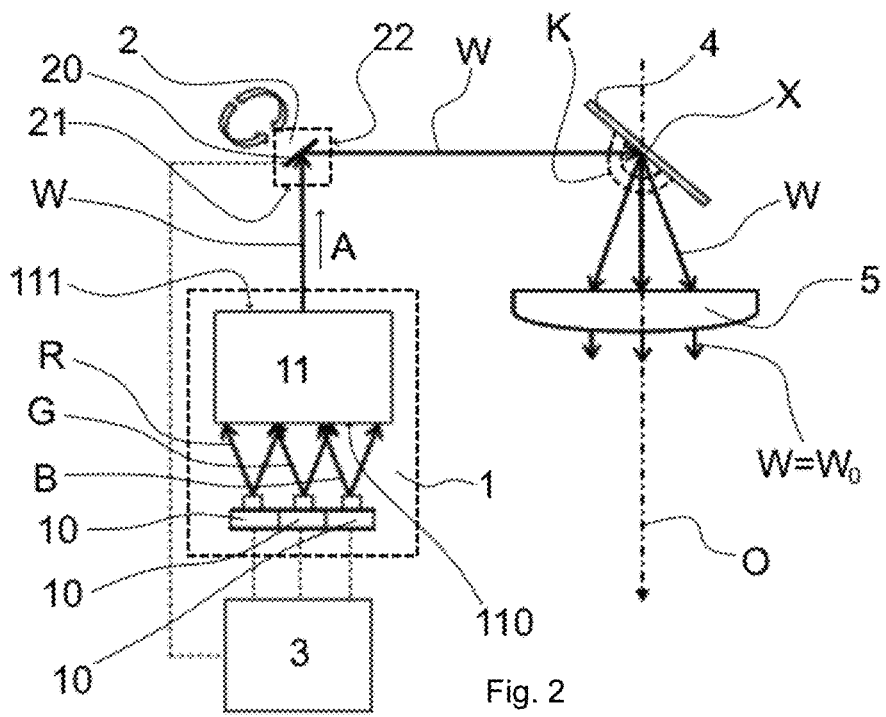
FIG. 2 shows the use of the invention in a device with a light-reflecting screen and with a point source of radiation formed on the axis of illumination.
Figure 2A:
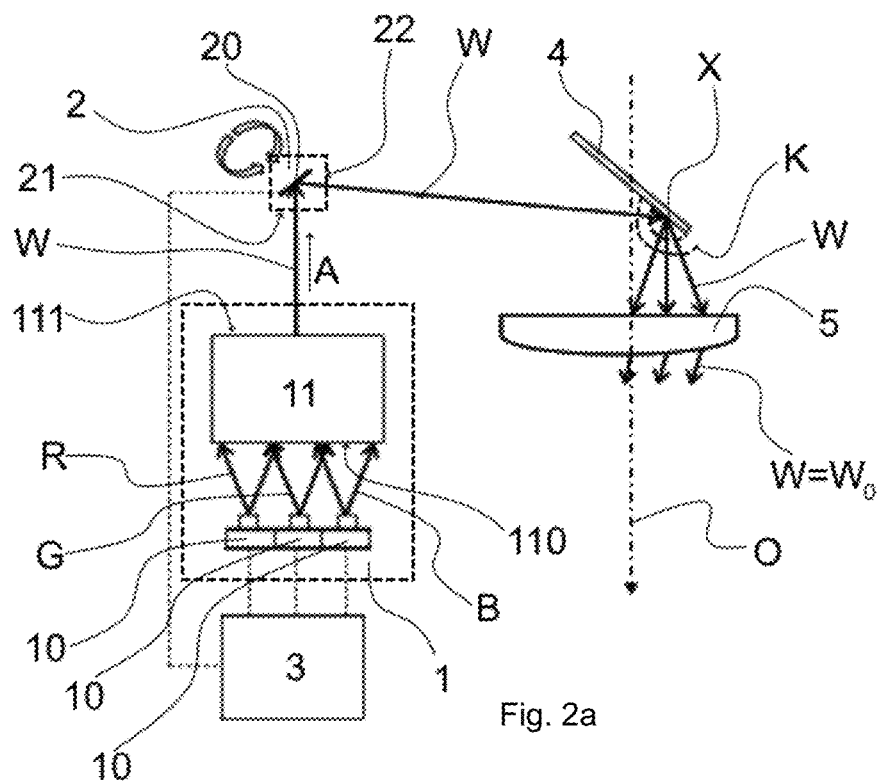
FIG. 2a shows the use of the invention in a device with a light-reflecting screen and with a point source of radiation formed off-axis of illumination.

In an exemplary embodiment shown in FIGS. 1, 1a, 3, 3a, the screen 4 is formed by a light-transmitting optical element for white laser light W, in the exemplary embodiment shown in FIGS. 2, 2a and 4, the screen 4 is formed by a light-reflecting optical element for white laser light W.

In the direction of travel of the white light W from the MEMS 2 to the screen 4, behind the screen 4, an output optics 5 of the vehicle lighting device is located. The output optics 5 of the vehicle lighting device is adapted to direct in the desired manner the output white light W relative to the axis O of illumination out of the vehicle lighting device in the form of output beams Wo of the white light W, as shown in FIGS. 1 and 1a, FIGS. 2 and 2a, FIGS. 3 and 3a and FIG. 4, and into the profile P of the output white light Wo intensity. The output optics 5 of the vehicle lighting device has the desired field of view, the desired modulation transfer function, the desired efficiency (luminosity), resolution and possibly also other aberrations, e.g., color, deformation, etc.), ideally always adapted for a specific vehicle lighting device with a laser radiation source and a MEMS element.

The position, area (size) and shape of the pattern formed on the screen 4 surface by scanning with laser white light W by reflecting this light W from the MEMS 2 mirror 20 determines the position, size and shape of the output light Wo stream behind the output optics 5 of the vehicle lighting device. Therefore it is not necessary for the lighting device to include, for example, different apertures to create different light modes (high beam, low beam, etc.), because all these modes are created by deliberately scanning the required part of the screen 4 surface with laser white light W by reflecting this light W from the controlled MEMS 2 mirror 20. To control the mirror 20, the power supply and control device 3 is provided with software with corresponding mirror 20 control models according to the desired output light characteristic Wo. The power supply and control device 3 is further provided with connecting elements for coupling to a vehicle control system.

The vehicle lighting device operates in such a manner that the power supply and control device 3 supplies and controls the individual laser radiation sub-sources 10, which transmit their output radiation to the light beam combiner 11. The light beam combiner 11 produces one output laser beam of white light W, which the combiner 11 emits scanning mirror 20 of the MEMS 2. The scanning mirror 20 moves according to the instructions of the power supply and control device 3 and continuously scans the screen 4 surface or part of the screen 4 surface with a laser beam of the white light W from the combiner 11. The screen 4 surface is scanned either in whole or in part, whereby the size (area), shape and position of the scanned part of the screen 4 surface corresponds to the desired shape, size and position of the output white light Wo of the vehicle lighting device. At each point of the screen 4, at which the laser beam of the white light W from the MEMS 2 hits the screen 4, a point source X of the same wavelength as the incident white light W from the MEMS 2 is formed due to the properties of the screen 4. The white light W from this point source X of white light W on the screen 4 propagates in the form of spherical wavefronts K further towards the output optics 5 of the vehicle lighting device, whereby the output optics 5 processes the incoming white light W and emits it in the form of output beams Wo of white light W in the desired shape into the desired direction in the direction of the axis O of illumination.

The invention claimed is:

1. A vehicle lighting device comprising a laser radiation source, wherein a controlled reflective MEMS scanning mirror is situated in the path of laser radiation from the laser radiation source, wherein in the path of radiation reflected by the controlled reflective MEMS scanning mirror is located an imaging optical element and further an output optics, wherein the laser radiation source and the MEMS are connected to a power supply and control device, wherein laser radiation source is formed by an RGB laser radiation source with output white light and the imaging optical element is formed by a screen which is adapted to convert a narrow beam of laser white light directed at the screen surface from the RGB laser source by means of the controlled MEMS reflective scanning mirror at each point of the screen surface to a point source of uniform white light on the screen surface, wherein the uniform white light from this point source on the screen surface has a spherical wavefront of white light propagation and has the same wavelength as the white light directed by the controlled MEMS reflective scanning mirror onto the screen, whereby the output optics is arranged in the direction of travel of the white light with the spherical wavefront from the point source on the screen surface.

2. The vehicle lighting device according to claim 1, wherein the RGB laser radiation source comprises an assembly of mutually separated R, G, B laser sub-sources of radiation, wherein each of these laser sub-sources of radiation is connected to the power supply and control device and is coupled to an RGB laser beam combiner, whereby behind the light output of the white laser light, the MEMS is arranged.

3. The vehicle lighting device according to claim 1, wherein the screen is formed by a light-transmitting optical element for white laser light.

4. The vehicle lighting device according to claim 1, wherein the screen is formed by a light-reflecting optical element for white laser light.

5. The vehicle lighting device according to claim 1, wherein the output optics of the vehicle lighting device is adapted to direct the output white light relative to the axis of illumination out of the vehicle lighting device in the form of white light output beams with a profile of output white light intensity.

6. The vehicle lighting device according to claim 1, wherein the power supply and control device is provided with software for controlling the MEMS for scanning the screen surface by reflecting white light from the controlled reflective scanning mirror to form a desired shape, position and area of the white laser light pattern on the screen.

* * * * *